United States Patent [19]

Andersson

[11] Patent Number: 4,737,630
[45] Date of Patent: Apr. 12, 1988

[54] OPTICAL SENSING DEVICE HAVING A THROUGH-HOLE FOR A MOVABLE INERTIA BODY IN A VEHICLE SAFETY SYSTEM

[75] Inventor: Tommy Andersson, Alingsas, Sweden

[73] Assignee: Autoliv Development AB, Vargarda, Sweden

[21] Appl. No.: 829,124

[22] PCT Filed: Apr. 12, 1985

[86] PCT No.: PCT/SE85/00168
§ 371 Date: Dec. 12, 1985
§ 102(e) Date: Dec. 12, 1985

[87] PCT Pub. No.: WO85/04627
PCT Pub. Date: Oct. 24, 1985

[30] Foreign Application Priority Data
Apr. 13, 1984 [SE] Sweden ............................ 8402093

[51] Int. Cl.⁴ .............................................. G01D 5/34
[52] U.S. Cl. ............................ 250/231 R; 73/517 AV
[58] Field of Search ............... 250/231 R; 73/517 AV, 73/517 R, 517 B, 517 A; 242/107, 107.4 A, 107.4 B

[56] References Cited

U.S. PATENT DOCUMENTS

| | | | |
|---|---|---|---|
| 3,140,612 | 7/1964 | Houghton et al. | 73/517 R |
| 3,146,057 | 8/1964 | Rona | 73/517 R |
| 3,224,279 | 12/1965 | Galli et al. | 73/517 R |
| 3,961,185 | 6/1976 | Brokenshire et al. | 73/517 R |
| 3,967,135 | 6/1976 | Balban et al. | 250/231 R |
| 4,103,842 | 8/1978 | Martin et al. | 242/107.4 A |
| 4,239,963 | 12/1980 | August et al. | 250/231 R |
| 4,376,390 | 3/1983 | Rines | 73/517 A |
| 4,450,353 | 5/1984 | Sjolund | 250/231 R |
| 4,556,799 | 12/1985 | Rolando | 250/577 |

FOREIGN PATENT DOCUMENTS

| | | |
|---|---|---|
| 2341637 | 2/1975 | Fed. Rep. of Germany . |
| 1351642 | 5/1974 | United Kingdom . |
| 1351642 | 5/1974 | United Kingdom . |

Primary Examiner—David C. Nelms
Assistant Examiner—William L. Oen
Attorney, Agent, or Firm—Spencer & Frank

[57] ABSTRACT

A device for sensing the position of a movable inertia body in a vehicle safety system comprises a radiation emitting means (20) and a radiation detecting means (21) adapted to receive at least a portion of the emitted radiation. The inertia body (23) can be either in a neutral position in which the body does not activate the safety system, or in at least one working position in which the body activates the safety system, and is adapted to influence the radiation received by the detecting means (21) depending on its position, so that the radiation received by the detecting means indicates the position of the inertia body. The radiation emitting means (20) and the radiation detecting means (21) are positioned on opposite sides of the inertia means, and the radiation can be, for example, light passing through a hole (22) in the inertia body. Due to the fact that the radiation passes through a hole in the inertia body, a reliable indication of the position of the inertia body is obtained.

15 Claims, 1 Drawing Sheet

OPTICAL SENSING DEVICE HAVING A THROUGH-HOLE FOR A MOVABLE INERTIA BODY IN A VEHICLE SAFETY SYSTEM

BACKGROUND OF THE INVENTION

The present invention is related to a device for sensing the position of a movable inertia body in a vehicle safety system in which the inertia body can be either in a neutral position, in which the body does not activate the safety system, or in at least one working position, in which the body activates the safety system. The device is primarily intended to be used in connection with standing, tiltable inertia bodies but can also be used in connection with movable inertia bodies of other types in vehicle safety systems. Such safety systems can comprise for example safety belts, inflatable air cushions and belt stretchers.

It is previously known to sense the position of movable inertia bodies used in locking devices for vehicle safety belts by means of displaceable bars or pivoting arms abutting against the inertia bodies and operated by the movements of the bodies. One example of such a device is disclosed in the British Patent Specification No. 1 351 642. One disadvantage of this type of sensing device is that the sensing means by its friction and mechanical inertia impedes the movements of the inertia body, so that the sensitivity of the locking device is influenced and can vary within rather wide limits. A particular disadvantage in connection with standing, tiltable inertia means intended to give the locking device the same sensitivity irrespective of the direction of the appearing force is that said sensitivity can be lost, because the sensing means may influence the inertia body differently in different moving directions of the inertia body.

Furthermore, through the German Patent Specification No. 26 30 553 it is previously known to use light rays or radiation from other radiating sources to sense or detect the position or the movements of inertia bodies in locking devices for vehicle safety belts. It is particularly previously known to use light rays that can be reflected by a surface of an inertia body, for example a pendulum, and detected by a light sensitive means. When the inertia body changes position, the output from the light sensitive means is changed, and this output is used for controlling the locking device. One disadvantage of this type of sensing device is that the light radiating means and the light detecting means must be positioned with a high degree of accuracy in relation to the reflecting surface of the inertia body to provide a reliable operation. This is particularly difficult to achieve, when the inertia body is a standing, tiltable inertia means.

SUMMARY OF THE INVENTION

The main object of the invention is to provide a sensing device for a movable inertia body in a vehicle safety system which does not influence the operation of the inertia body and which gives a strong and reliable indication signal without requiring a very high degree of accuracy in assembling the device. According to the invention, this object is achieved by giving the sensing device for features set forth in the claims.

BRIEF DESCRIPTION OF THE DRAWINGS

The sensing device according to the invention will now be further described below with reference to the accompanying drawings.

DESCRIPTION OF THE PREFERRED EMBODIMENT

Figure 1:
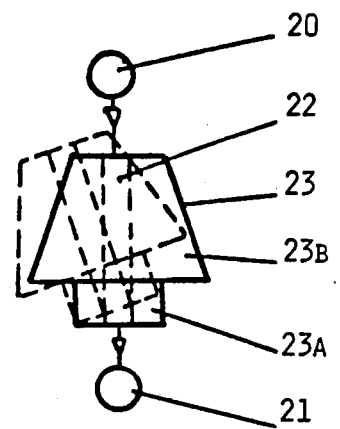
FIG. 1 is a schematical view of one embodiment of the sensing means in the device according to the invention.

The sensing means shown in FIG. 1 comprises a light emitting means 20 and a light receiving means 21. The inertia body, the position of which is to be detected, is shown as a standing body 23, provided with a thin circular-cylindrical foot 23A and a thicker, upwardly tapering head portion 23B having the shape of a truncated cone. In this case, the light emitting means 20 is positioned above the inertia body 23 and the light receiving means 21 is positioned below the inertia body. The inertia body is provided with a cylindrical through hole 22 running along the vertical central axis. The means 20 and 21 are so positioned that a light ray from the means 20 passes through the hole 22 in the inertia body 23 and hits the means 21, when the inertia body is in its upright position. This position is indicated with full lines in FIG. 1 and is the neutral position of the inertia body.

When the vehicle is accelerated or retarded above a certain limit value, the inertia body will tilt to the position indicated with broken lines in FIG. 1, so that the light ray from the means 20 no longer can pass through the hole 22 in the inertia body and, therefore, does not hit the means 21. Thus, an indication that the inertia body has left its neutral position and that the safety system is to be activated is obtained due to the fact that the light ray from the light emitting means no longer kits the light receiving means.

In the embodiment according to FIG. 1 the light emitting means 20 may be a light emitting diode and the light receiving means 21 may be a photo transistor.

The embodiment shown in FIG. 1 has the advantage that no high degree of assembling accuracy is required and that a strong and reliable indication signal to the light receiving means 21 is obtained. Furthermore, in this embodiment it is possible to determine the limit value of the acceleration or retardation at which the inertia body has to change position by changing the diameter of the hole 22 along a portion or the full length of the hole. Thus, it will be easy to manufacture inertia bodies having different sensibility. The embodiment has the disadvantage, however, that the light emitting means 20 and the light receiving means 21 must be mounted on either side of the inertia body, i.e. in different places in the safety system.

Figure 2:
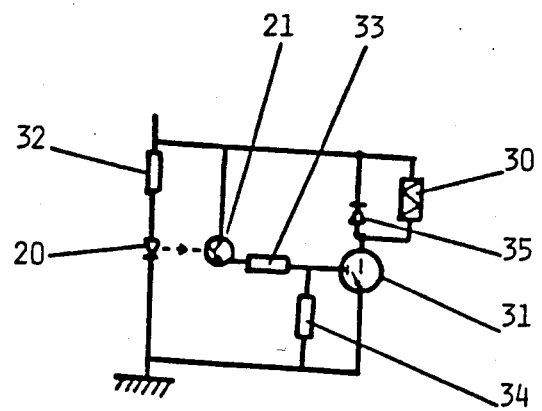
FIG. 2 is an example of an electric circuit in which a sensing means according to the invention can be connected.

FIG. 2 shows an example of an electric circuit in which the light emitting and light receiving means used in the embodiment according to FIG. 1 can be connected for controlling the activation of the safety system.

The circuit shown in FIG. 2 comprises a solenoid 30 for enabling or disabling a control means in a safety system, for example a locking means in a locking device for a safety belt. The solenoid is controlled by a Darlington-transistor 31, i.e. a Darlington-connected pair of transistors. This circuit is used to obtain a higher current amplification factor. The Darlington-transistor 31 is controlled by the phototransistor 21 which is connected in the base circuit of the Darlington-transistor and which is controlled by the light ray from the light emitting diode 20. The circuit further comprises coupling resistors 32, 33, 34 and a diode 35, connected in parallel with the solenoid to prevent high reverse voltages over the solenoid when the Darlington-transistor is switched off. The circuit has a 12 volt direct current voltage supply.

When the light ray between the light emitting diode 20 and the phototransistor 21 is interrupted, the current through the phototransistor 21 decreases. The Darlington-transistor becomes non-conductive and the solenoid 30 is switched off, so that the control means in the safety system is connected and activates the safety system.

While only one embodiment of the sensing device according to the invention has been described above and shown on the drawings, it is obvious that many modifications and variations are possible within the scope of the invention. The through hole must not necessarily be cylindrical and can have a cross section area that varies along the length of the hole. The hole can for example have the shape of a cone having the base turned downwardly. This will provide a better sensitivity in detecting the movements of the inertia means, as the entrance area for the light ray is small. Furthermore, a conical hole provides the advantage that the centre of gravity of the inertia means is moved upwardly. This fact makes the inertia means still more sensitive to the movements of the vehicle. A conical hole also provides the advantage that all the light passing through the entrance area of the inertia means can hit the light detecting means without being reflected by the walls of the hole. If the entrance area is small and the hole is cylindrical, a large portion of the incident light will be reflected and absorbed by the walls of the hole, thus reducing the possibility of the light detecting means to give a reliable indication of a change of position of the inertia means. Furthermore, the light emitting means can be positioned below the inertia body and the light detecting means above the inertia body, at least when the hole through the inertia body is substantially cylindrical. Alternatively, the means can be positioned horizontally on either side of the inertia body. This may be preferable in case the inertia body is a pivoting body, for example a pendulum. Instead of light rays any other type of rays can be used which can be controlled and detected, for example jets, sound waves, magnetic fields, etc. The detection and operation can also be reversed, i.e. so that the radiation passes through the hole and is detected only when the inertia body is in its working position.

What I claim is:

1. An inertia device for use in a vehicle safety system, said device comprising a movable inertia body (23) movable between an initial neutral position, in which the vehicle safety system is not actuated, and at least one working position, in which the safety system is actuated, the inertia body (23) being provided with a through ole (22) having an axis with an initial position when the inertia body (23) is in its neutral position, the inertia body (23) tilting when it moves from its neutral position to a working position so that the axis of the through hole (22) is tilted from its initial position when the inertia body (23) moves from its neutral position to a working position, said device further comprising a radiation emitting means (20) and a radiation detecting means (21) adapted to receive at least a portion of the radiation emitted from the radiation emitting means (20), the radiation emitting and detecting means (20, 21) being positioned one above and one below the inertia body (23) in such a way that radiation can pass through the hole (22), the arrangement being such that the radiation received by the detecting means (21) is influenced, by the inertia body (23) in dependence upon the position of the inertia body, so that the radiation received by the detecting means provides an indication of the position of the inertia body.

2. A device according to claim 1, wherein the radiation passes through the through hole (22) when the inertia body (23) is in its neutral position, and is interrupted when the inertia body is in its working position.

3. A device according to claim 2, wherein the initial position of the axis of the through hole (22) is vertical.

4. A device according to claim 3, wherein the inertia body (23) has a central axis and the through hole (22) runs along the central axis of the inertia body.

5. A device according to claim 4, wherein the through hole (22) has a cross sectional area varying along the length of the hole.

6. A device according to claim 5, wherein the through hole (22) in the inertia body (23) has the shape of a cone.

7. A device according to claim 6, wherein the cone has the base downwardly.

8. A device according to claim 7, wherein the radiation emitting means (20) is positioned above the inertia body (23).

9. A device according to claim 1, wherein the inertia body (23) defines a foot (23a), the inertia body standing vertically on the foot in the neutral position, and being movable to a tilted working position.

10. A device according to claim 9, wherein the foot is cylindrical and the inertia body (23), at its upper end, has a thicker head portion (23b).

11. A device according to claim 10, wherein the head portion (23b) is an upwardly tapering head portion having the shape of a truncated cone.

12. A device according to claim 1, wherein the through hole (22) of the inertia body (23) has a cross sectional area varying along the length of the hole.

13. A device according to claim 1, wherein the through hole (22) in the inertia body (23) has the shape of a cone.

14. A device according to claim 1, wherein the radiation emitting means (20) is positioned above the inertia body (23) and wherein the through hole (22) has the shape of a cone, the base of the cone being located at the base of the inertia body.

15. A device according to claim 1, wherein the radiation emitting means (20) comprises a light source and the radiation detecting means (21) comprises light responsive means.

* * * * *